J. P. THORP.
Wagon Shaft Shackle.
No. 2,362. Reissued Sept. 18, 1866.
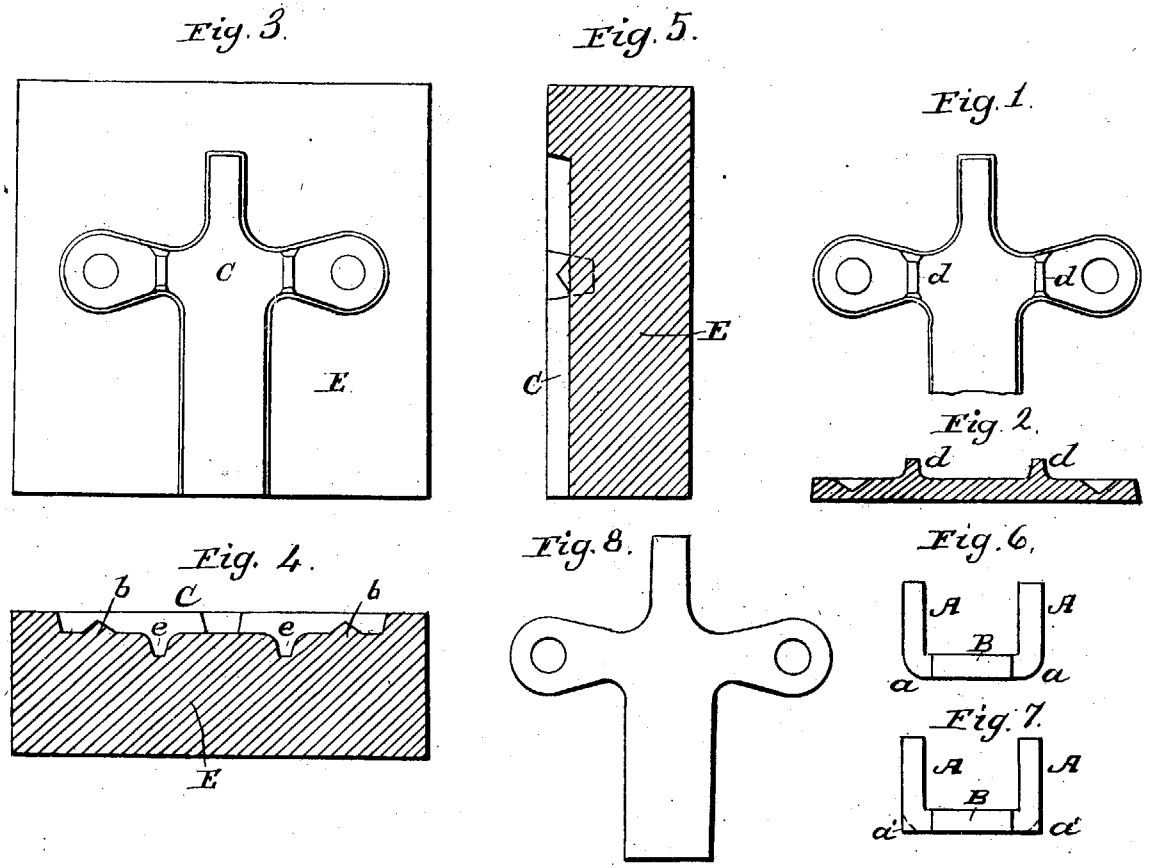
Witnesses:
Samuel A. Piper
George Andrews.
Inventor:
H. D. Smith & Co Assignees of J. P. Thorp.
by their attorney.
H. A. Seely
N. PETERS. Photo-Lithographer. Washington, D. C.

UNITED STATES PATENT OFFICE.

H. D. SMITH, G. F. SMITH, AND EDWARD W. TWICHELL, OF PLANTSVILLE, CONNECTICUT, ASSIGNEES OF JAMES P. THORP.

IMPROVEMENT IN WAGON-SHAFT SHACKLES.

Specification forming part of Letters Patent No. 28,114, dated May 1, 1860; Reissue No. 2,362, dated September 18, 1866.

*To all whom it may concern:*

Whereas JAMES P. THORP, of Plantsville, in the county of Hartford and State of Connecticut, did make a new and useful Invention having reference to Carriage-Shaft Connections or Shackles, and did apply for and obtain a patent on such, the said patent being numbered 28,114, and bearing date the 1st day of May of the year 1860; and whereas all the exclusive property in such invention and patent has been duly conveyed to us, H. D. SMITH & CO., of said Plantsville; and whereas by an insufficient and defective description and specification the said patent is believed to be invalid and inoperative, and we have applied for a reissue of it to correct such error or errors, we do hereby declare the invention to be fully described in the following specification, and represented in the accompanying drawings, of which—

Figure 1 is an under-side view, and Fig. 2 a transverse section, of a carriage-shaft shackle-blank made in accordance with the invention of the said THORP, and by means of a die, as hereinafter described. Fig. 3 is a top view, Fig. 4 a transverse section, and Fig. 5 a longitudinal section, of the said die. Figs. 6 and 7 will be hereinafter referred to and explained. Fig. 8 is a top view of a blank as it was usually made before the date of the invention of the said THORP.

The nature of the said invention of the said THORP consisted in a carriage-thill or shaft-shackle blank constructed with projections arranged at the junctions of its arms and body, and for the purpose of not only giving strength to the blank at the parts where are the bends of the arms, but enabling such bends to be formed with what are usually termed "square corners;" and the nature of the invention of the said THORP further consisted in a die for making such blanks, such die being constructed with recesses or cavities for the formation of the aforesaid projections, the whole being substantially as hereinafter explained, and as represented in the accompanying drawings.

The old mode of making the blank or swaging it in a die, and which we do not claim as the invention of the said THORP, caused its arms, where bent up into parallelism with each other and at right angles with the body of the blank, to be curved at the outer surfaces of the bends in manner as shown at *a a* in Fig. 6, in which A A represent the arms, and B the body, of the blank.

The invention of the said THORP causes the blank, after its arms are bent up, to have the form shown in Fig. 7, whereby the projection combined with the blank causes it to be formed with square or right-angular corners or parts *a′ a′*, whereby the blank is rendered much stronger at the junctions of the arms and body, and the expansion of metal which takes place in bending the arm is compensated for by a diagonal contraction of the metal, the same operating to prevent the destruction of the cohesion of the particles of the metal and the consequent weakening of the blank at the parts where it is bent.

The blank as usually made is cruciform, and the die for swaging such blank into form has a correspondingly-shaped cruciform matrix, which is shown at C as made in a block, E, of metal. (See Figs. 3, 4, and 5.) This die is also formed with protuberances *b b*, for making the depressions to include the places for drilling the bolt-holes in the arms.

The improved blank when formed has two projections, *d d*, arranged at, or about at, the junctions of the arms A A with the body B, the positions of these projections or their form being substantially as exhibited in Figs. 1 and 2 of the drawings.

The die has depressions or cavities *e e* made in it, as shown in Figs. 3 and 4, such being for the formation of the projections *d d*. These depressions or cavities are arranged with, at, or near the junction of those parts of the die which form the body and arms of the blank.

We would observe that in using the die the metal is to be pressed or forced into it by powerful pressure brought to act on the metal by any well-known means, such as are generally employed in swaging metal in and by a die.

Great advantages result in the construction of the blank and its die according to the invention of the said THORP, as the blank can be completed and finished at less expense, and is much stronger, and is not so liable to break as is an ordinary blank under the great and peculiar strain to which it is subjected while in use.

It is very important that the shaft-connection should be strong at the junction of the arms with the body of the blank, for if not so it when in use may part, and put in jeopardy valuable lives or property.

We claim as the invention of the said THORP the following:

1. The improved manufacture or carriage-shaft shackle blank constructed with the projections *d d*, arranged at, or about at, the junctions of the arms and body of the blank, substantially as and for the purpose specified.

2. For making the said blank, the die as constructed with the projections forming recesses arranged with respect to the portion for swaging the body and arms of the blank, substantially in manner as specified.

H. D. SMITH.
GEORGE F. SMITH.
EDWARD W. TWICHELL.

Witnesses:
S. H. NORTON,
SARAH E. NORTON.